US007124173B2

(12) United States Patent
Moriarty

(10) Patent No.: US 7,124,173 B2
(45) Date of Patent: Oct. 17, 2006

(54) METHOD AND APPARATUS FOR INTERCEPTING PERFORMANCE METRIC PACKETS FOR IMPROVED SECURITY AND INTRUSION DETECTION

(76) Inventor: Kathleen M. Moriarty, 205 Walden St. Apartment 6S, Cambridge, MA (US) 02140

( * ) Notice: Subject to any disclaimer, the term of this patent is extended or adjusted under 35 U.S.C. 154(b) by 794 days.

(21) Appl. No.: 09/844,849

(22) Filed: Apr. 30, 2001

(65) Prior Publication Data

US 2002/0161755 A1 Oct. 31, 2002

(51) Int. Cl.
G06F 15/16 (2006.01)
G06F 15/173 (2006.01)
G06F 7/04 (2006.01)
G06F 17/30 (2006.01)
G06K 9/00 (2006.01)
H04L 9/32 (2006.01)
G08B 29/00 (2006.01)

(52) U.S. Cl. .................. 709/219; 709/229; 709/226; 709/225; 709/224; 726/2

(58) Field of Classification Search ............... 713/200, 713/201; 709/224, 219, 229; 726/2
See application file for complete search history.

(56) References Cited

U.S. PATENT DOCUMENTS

| | | | | |
|---|---|---|---|---|
| 5,781,550 | A * | 7/1998 | Templin et al. ............. | 713/201 |
| 6,006,258 | A | 12/1999 | Kalajan ....................... | 709/219 |
| 6,006,272 | A | 12/1999 | Aravamudan et al. ...... | 709/245 |
| 6,009,526 | A | 12/1999 | Choi ........................... | 713/200 |
| 6,055,236 | A | 4/2000 | Nessett et al. .............. | 370/389 |
| 6,098,172 | A | 8/2000 | Coss et al. .................. | 713/201 |
| 6,144,961 | A | 11/2000 | de la Salle .................. | 707/10 |
| 6,154,839 | A * | 11/2000 | Arrow et al. ............... | 713/201 |
| 6,157,955 | A | 12/2000 | Narad et al. ................ | 709/228 |
| 6,321,337 | B1 | 11/2001 | Reshef et al. ............... | 713/201 |
| 6,366,950 | B1 * | 4/2002 | Scheussler et al. ......... | 709/206 |
| 6,389,462 | B1 * | 5/2002 | Cohen et al. ............... | 709/218 |
| 6,614,763 | B1 * | 9/2003 | Kikuchi et al. ............. | 709/224 |
| 6,711,610 | B1 * | 3/2004 | Harris ........................ | 709/217 |
| 6,742,044 | B1 * | 5/2004 | Aviani et al. ............... | 709/235 |
| 6,775,704 | B1 * | 8/2004 | Watson et al. .............. | 709/229 |

(Continued)

*Primary Examiner*—Zarni Maung
*Assistant Examiner*—Hassan Phillips
(74) *Attorney, Agent, or Firm*—Cooper & Dunham LLP

(57) ABSTRACT

A method in which a border device of a destination network located outside of a recipient personal computer or network intercepts a performance measurement packet for a specified recipient in order to relieve problems that arise when performance metric packets are interpreted as harmful to a recipient network or server. A border device intercepts the performance metric packet and returns requested information to the sender while masking the source address of the response as the original destination address of the original recipient or the network number of that recipient. The sender of the packet receives ample information on the performance metrics to the perimeter of the recipient for use in its application and the recipient network is protected as well by masking the IP addresses in use on the its network. The method is applicable in both existing performance metric protocols and is adaptable to a new protocol which would also additionally assist in identifying the purpose of the performance metric packets and protecting the destination network from outside interference. The number of performance metrics queried by some applications could also be reduced through the use of CIDR network block tables. These tables would be referenced to determine if a previous response was cached from this network block or to allow for a longer cache time-out due to the static nature of CIDR blocks.

19 Claims, 5 Drawing Sheets

U.S. PATENT DOCUMENTS

| | | |
|---|---|---|
| 6,928,545 B1 * | 8/2005 | Litai et al. .................. 713/185 |
| 2001/0037389 A1 * | 11/2001 | Fujimori et al. ............ 709/225 |
| 2001/0042200 A1 * | 11/2001 | Lamberton et al. ......... 713/151 |
| 2002/0002686 A1 * | 1/2002 | Vange et al. ................ 713/201 |
| 2002/0042883 A1 * | 4/2002 | Roux et al. .................. 713/201 |
| 2002/0069366 A1 * | 6/2002 | Schoettger .................. 713/201 |
| 2002/0147927 A1 * | 10/2002 | Tait ............................. 713/201 |
| 2002/0157020 A1 * | 10/2002 | Royer ......................... 713/201 |

* cited by examiner

METHOD AND APPARATUS FOR INTERCEPTING PERFORMANCE METRIC PACKETS FOR IMPROVED SECURITY AND INTRUSION DETECTION

FIELD OF THE INVENTION

The invention relates to systems and applications on a network such as the Internet that send and are recipients of performance measurement queries. Such systems and applications include and are not exclusive to routers, firewalls, proxy servers, stateful filtering or other filtering devices, clients, servers, hosts, load distribution/balancing systems, caching servers, and similar devices. Often these systems determine the best server to use to connect a client to a server for a network application. More specifically, a method and apparatus are provided for intercepting and responding to performance metric packets (which are also known as performance measurement packets) sent from a sender to a recipient or recipient network at a point outside of a recipient personal computer or network.

DESCRIPTION OF THE RELATED ART

As the Internet began to develop, the measurement of the time it takes to send and receive a packet through the use of ping packets became a widely used tool. This measurement is commonly called the round trip time ("RTT") and can be gathered through the use of other protocols as well by measuring the amount of time taken to send and receive the packet. The design of Internet packets included a field in the packet header by design to provide information as to the number of servers or routers a packet traversed in its path between the source and destination of the packet. The field that identifies the hop count is known as the time to live ("TTL") field.

Internet Control Message Protocol ("ICMP"), Transmission Control Protocol ("TCP"), and User Datagram Protocol ("UDP") are all transport layer protocols that are then encapsulated in internet protocol ("IP") packets to be sent across an IP network such as the Internet. All of these protocols can be used to gather the measurements like the RTT and the TTL of a packet between hosts. The TTL can be used to determine the path a packet takes from one computer system to another computer system mapping out all of the nodes between the two hosts by sending out packets starting with a TTL of 1 to get the IP address or name of the first hop from the sender to the recipient of the packet. The second packet sent out has the TTL field set to 2 in order to obtain the name or IP address of the host at the second hop in the path between the source or sending client and the destination or recipient client. The TTL field continues to be incremented until the final destination is reached. The round trip time of each step in the iterative process is also returned to help gather the path information and the performance metrics for each hop, server, or router along the path between the two hosts.

These metrics are useful tools for testing the performance between two or more hosts on the Internet as well. An example of this would be a load balancing system that is used to determine the closest server to a client in term of network metrics. In this case, a client initiates a connection to a server or recipient and the packet is received by a 'load distribution' system on behalf of the server. The load distribution system communicates with other load distribution systems that are connected to servers that can also handle the client's request. The load distribution servers then use performance metrics to determine which server would provide the best connection to the client. The load distribution servers and application servers, such as a web server, file transfer protocol ("FTP") server or other Internet application server, may be at various physical locations and may be networked to the Internet via different Internet Service Providers ("ISPs") thus providing various connection speeds to any one client on the Internet. The servers or load distribution servers may send multiple performance metric queries to the client system to determine which application (web, etc.) server to establish the application connection to.

As mentioned, various transport level protocols can be used to gather these statistics, some of which include ICMP, UDP, and TCP packets. Currently, commonly used ICMP echo and echo-reply packets ("ping packets"), UDP packets (ex: traceroute packets), and other protocols such as TCP, use an application request and response procedure like a Domain Name Service (DNS) query. The above mentioned protocols provide the necessary information for the performance, distance, or path information between two hosts or networks, but all can be or appear to be malicious to a recipient of the packet.

In other words, the sending system can gather information for malicious purposes as to the existence of a recipient if a response is received. The sending system can also gather information as to the path taken between the two sending systems. As a result of various implementations of these transport level protocols and other protocols, it is possible to determine information about the recipient computer or destination host that could be useful to someone with malicious intent. Computer systems are often broken into after such an information gathering process or reconnaissance phase of an attack has been completed. The information gathered might be used to determine the active systems on the network and the operating systems of each as well as any protocols that respond to queries by an outside server. Thus, performance metric queries that were initially designed to be useful tools for network and system administrators have also become useful tools in the reconnaissance phase of a network attack.

For example, a ping packet can be used to map a network, to flood a host or network, identify an operating system, or for other malicious intent. Many networks block ping packets from entering their network as a precautionary measure. The result of this is that an initiator of a the valid request for information can not receive the performance information required to know if a network is reachable or to determine the best path or server for a connection to the network. If ping packets are permitted, security administrators have the difficult task of attempting to distinguish non-malicious from potentially malicious packets.

A traceroute packet can be used to determine the path taken from the source host to the destination host and to gather performance metrics (measurments) at each hop along the path. If enough traceroute commands are initiated, it would be possible to determine all of the paths possible to enter a specific network. There may be one or more entry points to a network and a traceroute packet can be used to show all of the hops prior to the entry points of a network. This information would be enough for a malicious entity gathering the data to launch a successful denial of service attack against the network by targeting each entry point. Since there are many useful applications of traceroute packets, it cannot always be assumed that the intent is malicious. Therefore, in some cases traceroute packets should not be blocked on a network. The security administration of the network would have to distinguish non-malicious packets from potentially malicious packets causing additional unnecessary work especially in light of the increased use of performance metric gathering servers used on the Internet.

Alternatively, it is often desirable to query a server such as the DNS (Domain Name Service) server of the client who initiated the request. This query would gather statistics on the performance metrics for the RTT of a packet between the server and the client DNS server. This might be useful since the query is typically allowed by the DNS server hence, the server initiating the query is more likely to receive a response. Also, the request might be via the TCP protocol and the measurement may better reflect the performance of the application to be used once the best path is selected. DNS and other services are often outsourced or located on different networks from client systems, thus providing an inaccurate measurement to the requesting application or server. Another concern is that DNS servers and other application servers frequently have exploitable bugs, which raise the concerns of the administrators when there are unnecessary queries that could potentially be malicious queries to the application servers wasting unnecessary time.

As mentioned above, some networks have multiple paths that can be used to reach a destination that resides on the network. The existence of multiple paths may be a result of having multiple connections to the Internet or network/routing decisions made at steps between the initiating host and the recipient host system or client (destination host). If the information were gathered from multiple servers to a network where the client resides, it would be possible to record the path information and map out the network and the various connections to the Internet over a period of time. The map of the network and the entry points could be used to launch a denial of service attack against the client's network and leave them with no available network resources since all of the various connections to the Internet were identified and flooded leaving little if any access to the Internet for the duration of the attack. Another possibility of malicious behavior would be targeted attacks against the identified host systems that respond to the performance metric queries. These hosts are now known to be active systems and thus subject to attack.

Performance measurements can be used as described for a 'load distribution' system or other performance metric system for analyzing the connection speed between to systems. As a result, there is often a large number of queries used to obtain the information needed in order to decide upon the best system in which the client should be connected to in order to provide the best connection for the end users satisfaction. There are some systems that try to mitigate the number of queries used and how often they are used, but there are further improvements that could be made to mitigate this problem. Currently, there are systems that cache responses for a period of time to be used for subsequent connection requests from clients in the same network. Other means of minimizing the number of queries used is through the use of routing protocols that can determine the best path from the client to one of the servers with which the connection will ultimately be established. Even with these options in place, the sheer number of queries received by clients' network can still be quite large. This causes a problem where the administrators have to determine the intent of the queries and also generates unnecessary traffic to the client's network. Subsequent connection requests from the client can initiate this process all over again where the servers or load distribution type systems query the client's network to determine the server to connect the client based on the fastest connection speed between the client and one of the servers.

Thus, the otherwise useful performance measurement packets result in several problems. The first problem is that destination networks or recipients see a potentially large number of performance queries that may appear to be malicious in nature hitting their network. Security administrators carefully watch their network to determine if there is any malicious intent in the packets reaching their network. As mentioned above, there is quite a bit of information that can be gathered from the types of requests that are sent as performance metric measurement packets. Both individual requests from applications like ping and traceroute packets as well as measurement requests from systems like a load distribution system or web caching server appear to be harmful packets to the recipient's network. Often, the performance measurement packets like ping and traceroute packets are blocked at the border of the client's network if possible. This presents a problem for both the sender of the packet who cannot determine the existence, RTT, or hop count of the destination host as well as the network at the client's end of the connection. Resources at the client's end, or recipient's end, of the network are used to drop the packets if it is possible and if not, the traffic can set off alarms and cause needless extra work for the security administrators of the site. The security administrators have to attempt to determine the intent of the sender to know if an attacker is at the reconnaissance phase of a network attack or if it is a load distribution or other performance metric system gathering statistics that are not harmful in intent. Recently, this type of probe on a network has become quite common. It also provides a cover for an attacker to gather information and mask it as that of valid network traffic.

SUMMARY OF THE INVENTION

An object of the present invention is to provide a method of gathering information about a connection between a sender and a recipient in a network which avoids the problems identified above.

A second object is to provide a new distance measuring protocol, DMP to provide information about a connection between a sender and a recipient in a network that avoids the problems identified above.

A third object of the present invention is to provide a border device positioned between a sender and a recipient for use in gathering information regarding a connection between the sender and the recipient in a network that avoids the problems identified above.

A method of gathering information about a connection between a sender and a recipient in a network having the steps of: a) generating an information query by the sender; b) sending the information query to the recipient; c) receiving the information query at a border device of the recipient; and d) processing the information query at the border device to provide selected information requested by the information query to the sender. The selected information provided to the sender may include identification information that is different than that of the border device. The method may further include the steps of: e) storing at least a portion of the selected information sent from the border device to the sender at the sender when a destination address of the information query corresponds to a predetermined group of addresses stored at the sender; and f) utilizing the stored selected information from the response whenever an information query is generated including any of the predetermined group of addresses stored at the sender. In addition, the method may include a step of deleting the stored selected information after a predetermined period of time.

A method of gathering information about a connection between a sender and a recipient in a network having the steps of: a) generating an information query by the sender; b) sending the information query to the recipient; c) receiving the information query at a border device of the recipient; and d) processing the information query at the border device according to a plurality of predetermined rules, wherein said predetermined rules provide for one of: providing selected information requested by the information query in a response to the information query to be sent to the sender; discarding the information query; and passing the information query through the border device to the recipient for response. One of said plurality of predetermined rules provides for discarding the information query when the information query is of a size larger than a predetermined range of allowable sizes. Another rule of said plurality of predetermined rules provides for passing the information query through the border unit to the recipient for response when the information query includes predetermined identification information. The method may further include the steps of: e) storing at least the selected information of the response provided from the border device when a destination address of the information query to which the response was generated corresponds to any of a plurality of predetermined addresses stored at the sender; and using the stored selected information of the response whenever an information query including any of the plurality of predetermined addresses stored at the sender is generated rather than sending the information query to the recipient. The stored selected information may be deleted after a predetermined period of time passes.

A border device positioned between a sender and a recipient for use in gathering information regarding a connection between the sender and the recipient in a network, the border device having: a) a receiver for receiving an information query from the sender addressed to the recipient; b) a processor for processing the information query on behalf of the recipient to generate a response to the information query including selected information; and c) a transmitter for sending the response including the selected information to the sender. The response to the information query includes identification information that differs from identification information of the border device. The border device may respond to information queries for a plurality of recipients.

A method of gathering performance measurement information regarding a connection between a sender and a recipient in a network having the steps of: a) generating an a performance measurement packet by the sender; b) sending the performance measurement packet to the recipient; c) receiving the performance measurement packet at a border device of the recipient; d) and processing the performance measurement packet at the border device according to a plurality of predetermined rules, wherein said predetermined rules provide for one of: generating a response packet to the performance measurement packet providing performance metric information to be sent to the sender; discarding the performance measurement packet and passing the performance measurement packet to the recipient. When the predetermined rules provide for generating the response packet to the performance measurement packet including performance metric information, the response includes identification information that is different than identification information of the border device. One of the predetermined rules provides for discarding the performance measurement packet when a size of the performance measurement packet exceeds a range of allowable sizes. Another rule of the plurality of predetermined rules provides for passing the performance measurement packet through the border unit to the recipient when the performance measurement packet includes predetermined identification information. The method may further include the steps of: e) storing at least the performance metric information of the response packet generated by the border device in response to the performance measurement packet when a destination address of the performance measurement packet corresponds to one of a plurality of predetermined addresses stored at the sender; and e) using the stored performance metric information of the response packet whenever a performance measurement packet including any of the plurality of predetermined addresses stored at the sender is generated by the sender rather than sending the performance measurement packet to the recipient. The method may further include the step of deleting the stored performance metric information after a predetermined period of time.

A method of gathering information about a connection between a sender and a recipient in a network having the steps of: a) generating an information query by the sender; b) sending the information query to the recipient; c) receiving a response to the information query including selected information from the recipient by the sender; d) storing at least the selected information of the response for a predetermined period of time when the destination address of the information query is one of a plurality of predetermined addresses stored at the sender, such that when a subsequent information query includes a destination address corresponding to any of the plurality of predetermined addresses, the stored selected information of the response is used without sending the subsequent information query to the recipient and e) the predetermined period of time may be different from a period of time for which the selected information of the response is stored when the destination address of the information query is an address other than one of the plurality of predetermined addresses. The plurality of predetermined addresses may be a group of Classless Inter-Domain Routing addresses.

DETAILED DESCRIPTION OF THE INVENTION

Figure 1:
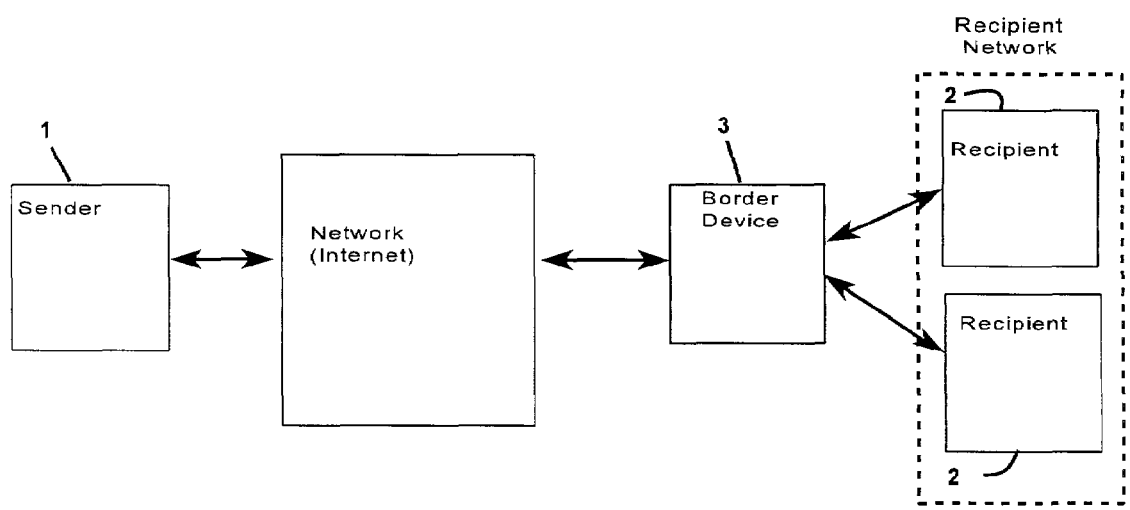
FIG. 1 is a block diagram illustrating communication between a sender and a recipient in a network.

FIG. 1 represents a connection between the sender 1 and a recipient 2. The sender 1 may be, for example, an individual establishing connection to the recipient 2 via a personal computer or a server of a local area network. In addition, the sender 1 may be a device or entity which requests performance measurement information for use with its applications such as a load balancer server. The recipient 2 may similarly be an individual or part of a network of potential recipients. At a border of the recipient personal computer or network a border device 3 is positioned. The border device 3 provides information regarding the connection between the sender 1 and recipient 2 on behalf of the recipient 2 and at the same time conceals its own identity. More specifically, the border device 3 provides a response to the sender 1 including performance metrics such as the TTL and RTT regarding the connection between the border device 3 and the sender 1.

Figure 2:
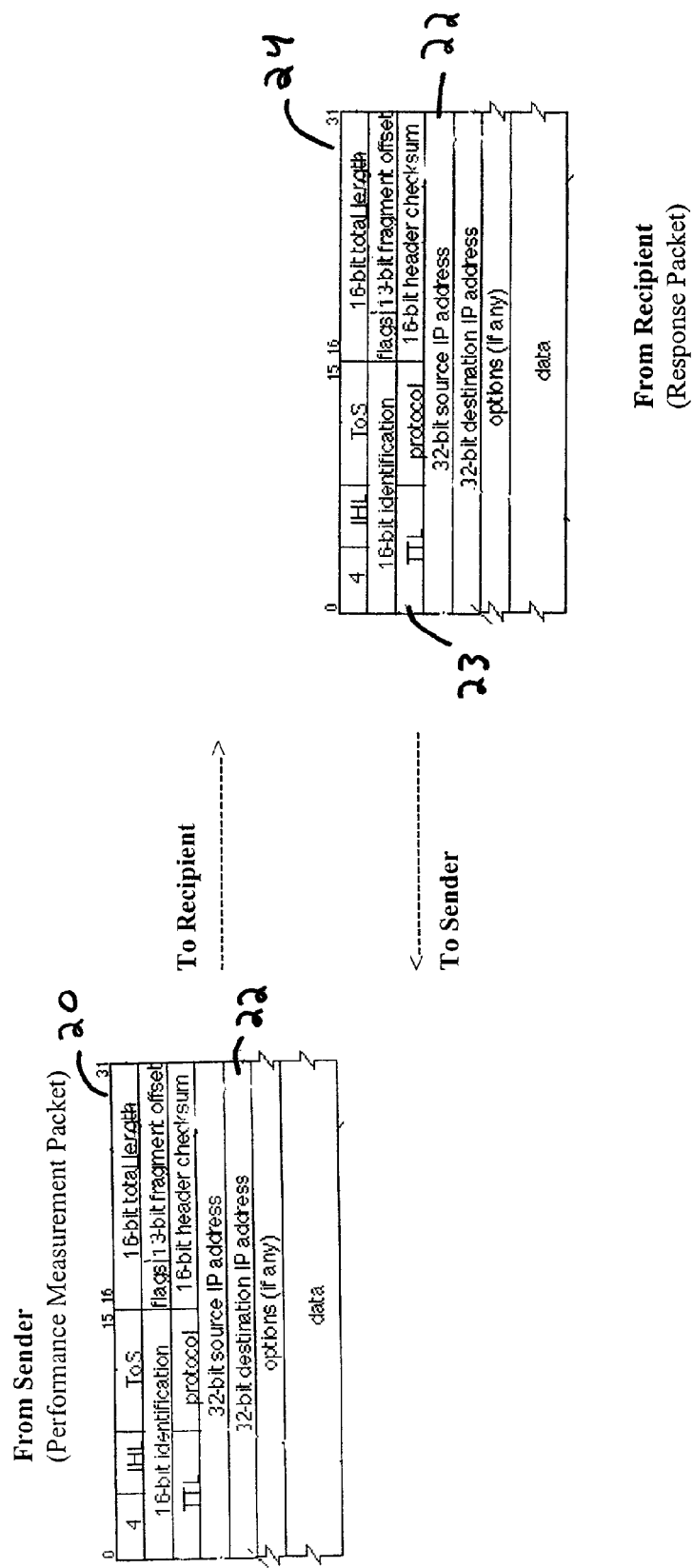
FIG. 2 is an illustration of a performance measurement packet and a response packet sent to respond to the performance measurement packet.
Figure 3:
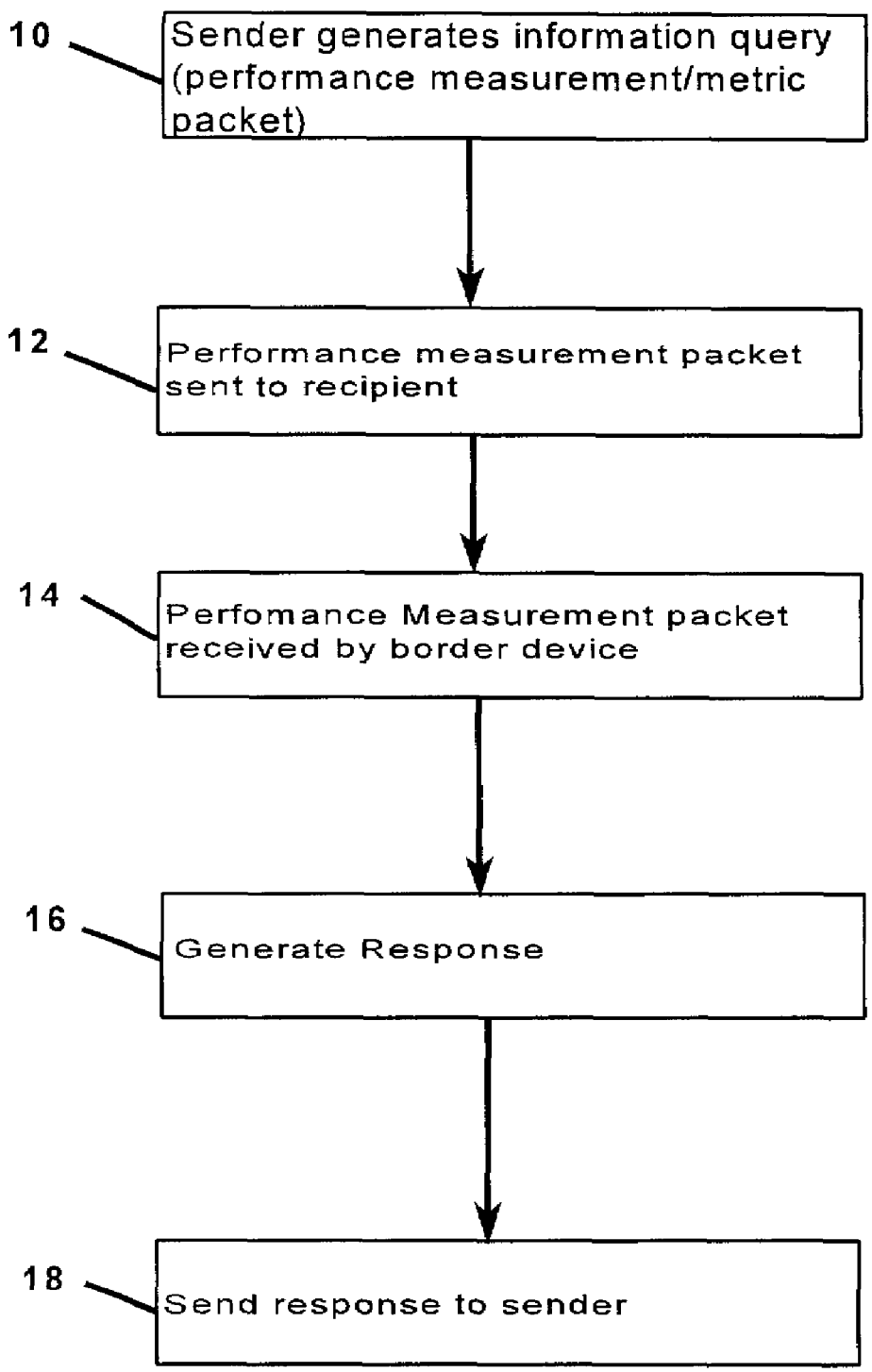
FIG. 3 is a flow chart illustrating operation of a method of gathering information according to an embodiment of the present application.

FIG. 3 illustrates a procedure for gathering information about a connection between the sender 1 and recipient 2 illustrated in FIG. 1. At step 10, the sender 1 generates an information query, such as a performance measurement packet 20 as shown in FIG. 2, for example, to request information about connection between the sender 1 and recipient 2. At step 12 the performance measurement packet 20 is sent to the recipient 2. The performance measurement packet 20 includes a destination address or network number 22 that corresponds to the recipient 2. At step 14 the border device 3 receives the performance measurement packet 20. If the destination address or network number 22 of the performance measurement packet 22 matches that of a range of addresses corresponding to a group of at least one recipient for which the border device 3 is to respond, at step 16, the border unit 3 generates a response, or response packet 24 as illustrated in FIG. 2, to the performance measurement packet 20 and includes the information about the connection requested by the sender 1. Such information generally includes the RTT (not shown) and TTL 23 between sender 1 and recipient 2. However, the performance metric packet 20 never reaches the recipient 2, instead the border device 3 responds with information regarding the path to the border device 3. The border device 3 also includes the original destination address or network number 22 of the recipient as the source address of the response packet 24. At step 18 the response is returned to the sender 1 and the information is used to determine the best path between recipient and sender or otherwise utilized by the application requiring the metric information.

The sender 1 is provided with the required information regarding the connection between the sender 1 and recipient 2, however, that information represents only information regarding connection between the sender 1 and the border unit 3, which is located outside, or at a border of the recipient's personal computer or network. Since the connection between the border device 3 and recipient 2 within the recipient network remains constant, the information concerning connection between the sender 1 and the border unit 3 is sufficiently accurately to allow the sender 1 to properly execute its applications.

The procedure of FIG. 3 can be adapted to existing performance measuring protocols such as the Internet Protocol to mitigate security concerns of a recipient 2. In such a situation, however, the destination address, and not the network number, of the recipient would be included in the response packet as the source address of the response packet because the conventional internet protocols would discard a response packet having a network number as a source address. Most simply, this procedure is used in devices or hosts to effectively intercept performance measurement packets on behalf of the recipient 2 and to provide adequate information to the sender 1 or source of the performance measurement packet as to the performance of the packet via the RTT, TTL, or other performance metrics requested of the destination host, or recipient 2.

The procedure of FIG. 3 can also be applied to a specific application as a new type of protocol which this specification will refer to as a distance metric protocol ("DMP"). The DMP protocol identifies its requests as a DMP request. The use of a specific protocol designated for this purpose would identify it uniquely to devices and filter lists, etc. Such a DMP protocol can then be distinguished from other protocols that gather performance metrics and can be trusted since path information, host existence, network mapping, protocol existence (port probe), operating system mapping, and other malicious intent would not be possible. The DMP protocol would be used to replace current applications, which gather information as to the amount of time taken for a packet to travel from a sender to a destination and back to the sender as well as gathering the hop count or TTL of a packet.

One embodiment of the DMP protocol can be an Internet protocol for sending a performance measurement packet 20 from a source host or sender 1 to a destination host or recipient 2 to gather performance metrics such as the round trip time (RTT) and time to live (TTL) where the packet 20 is intercepted outside the destination network by a border device 3 such as a perimeter router or firewall for example. The border device 3 can be programmed to respond for any host or recipient 2 within a network block or range or to a specific host address to allow for ambiguity as to the existence of network IP addresses on the protected network by the intercepting host (border device). The response to the request has the source address of the destination host or network number of the destination host or a different address instead of the address of the border device 3 intercepting the packet and sending the response. This prevents the requestor (sender) of the query from gathering information as to the design of the network and the perimeter IP addresses of the network or the intercepting device.

For example, load balancer servers commonly use performance metric packets to gather data in order to determine the most efficient path between the load balancing servers to a client or the client's network which can provide a desirable connection to an individual who wants to connect to the server. As mentioned, the ICMP protocol is a common protocol for determining the round trip time between two hosts, like the load balancing server and a server to which connection is desired. In a traditional embodiment, an echo packet is sent from the load balancer on behalf of the servers serviced by the load balancing server to the client which responds with an echo-reply ICMP packet type. The echo reply includes metrics such a the TTL and the RTT, from which the load balancing server determines the best server to use to provide the best connection. However, as mentioned above ICMP packets can be used to gather information about a network such as mapping information (identifying all valid addresses on the network) which can be used against the network.

The DMP protocol of this invention is provided for performing performance measurements. The DMP protocol has an assigned port and protocol number to distinguish the request type of the DMP protocol from those of other protocols. If the border device 3 receives the DMP packet or other measurement packet at the perimeter of a network, meaningful results can be returned to the initiator of the request. Through the DMP protocol, existence of a network can be identified and the RTT and TTL determined to the border or perimeter where the recipient may reside. This information is enough for applications that seek to determine the best path from multiple points in the Internet since the remaining time interval into the client network typically remains a constant from the perimeter of the client network depending upon the placement and use of the DMP protocol or border device. The recipient is free to essentially define the border at which the border device is placed in accordance with there needs. In fact, the border device may even be placed within a local area network (LAN) to provide security between different internal groups, for example.

The main concept here is that the identity and existence of the host, or recipient 2 remains unknown to the sender 1 of the metric query since the response is from an intermediate device, the border device 3, answering for any number of programmed hosts, network blocks, or address ranges. The other protected information is the path to the recipient 2 since the only information returned is the limited performance metrics that might include the RTT and the TTL of the packet and potentially other limited information from the border device 3. As noted above, the round trip time is the time it takes for the packet to be sent from the source, received by the client or intermediate device and processed, then the return packet is received by the sender of the DMP query. Information like the TTL is contained in the packet header of any IP packet. The distance metric protocol described here can be implemented with any protocol to query the IP address of the client/recipient in which the distance information is required rather than obtaining the distance information from another host such as a DNS server which, may or may not be located on the same network.

As discussed above, the procedure of FIG. 3 can be applied to currently existing performance measurement protocols. In this embodiment, the border device 3, such as a router or firewall outside of a destination network or server implements the method by which metric performance packets are intercepted at the border of the destination network or recipient 2. The border device 3 intercepts performance metric packets whose destination includes a predetermined range of destination addresses or network numbers. The border device 3 generates a response including performance metrics expected by the sender 1 of the performance metric packet 20. The source address of the response is that of the recipient while the metric information such as the round trip time from the sender 1 to the border device 3 is returned. The sender 1 would then be provided with sufficient information to determine which server provides the best connection for a requested connection, if the sender were a load balancer server for example, however, the identity and address of the border device 3 are concealed. Thus, since the address and existence of the border device 3 are hidden, it is not possible to determine how many entries into a network or server exist or the addresses of these entries if used in this way. Furthermore, since the border device 3 responds to a programmed list of addresses or network numbers and responds with the provided destination address whether or not that address is active, mapping of the network is also prevented.

In an alternative embodiment, the procedure of FIG. 3 is modified to allow recipients to control the response of the border device 3 based on a plurality of predetermined riles provided by the recipient or a network administrator of the recipient network. This procedure is explained with reference to FIG. 4. At step 40 the sender 1 generates an information query or performance metric packet 20 requesting information regarding connection between sender 1 and recipient 2 and including a destination address corresponding the recipient 2. In step 42 the performance metric packet 20 is sent to the recipient 2. In step 44, the border device 3 receives the performance measurement packet 20. When the destination address of the performance measurement packet corresponds to a recipient for which the border device 3 is to respond, the border device 3 responds according to a plurality of predetermined rules. At step 46, the rules determine whether the border unit 3 responds to the packet as in the procedure of FIG. 3 SS6, discards the packet SS7, or passes the packet to the recipient 2, SS5 or other point in the network.

Figure 4:
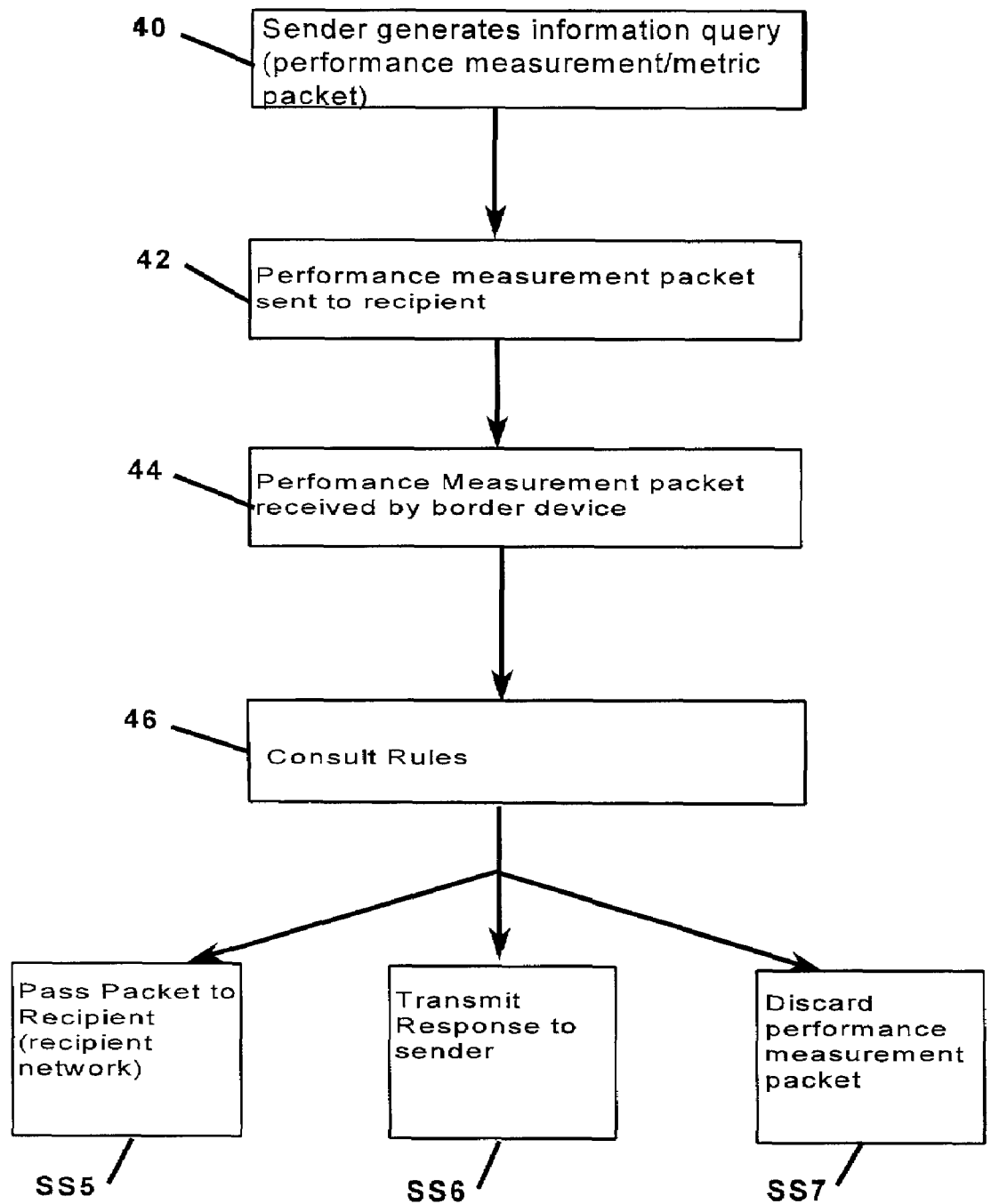
FIG. 4 is a flowchart illustrating a method of gathering information according to a second embodiment of the present application.

The procedure of FIG. 4 can be adapted to compliment current security procedures. Intrusion Detection has led security experts to identify a signature of the packets sent from certain vendors which enable them to distinguish these packets from others and identify the vendor of the load balancer. Therefore, one of the predetermined rules may instruct the border device 3 to recognize such distinguishing information and allows such performance measurement packets to enter the recipient personal computer or network or to allow the border device 3 to respond. Another rule may instruct the border device 3 to analyze the size of a performance measurement packet 20. Where a size of the packet is larger than a predetermined size, the packet is determined to be malicious and is discarded. Using these predetermined rules allows the recipient more flexibility in protecting their personal computer or network from attack. Of course, other rules can be implemented according to the needs of the recipient.

Either procedure illustrated in FIG. 3 and/or FIG. 4 can also be adapted to optimize the query process in the case where there are multiple devices that may be in different locations or connected to various ISP's. In such a case, performance metrics determine the fastest connection from one of the devices, or senders, to the client/recipient or network that is being polled. Systems such as Internet application load balancers, as discussed above, or web caching devices perform these measurements to provide an end user with the fastest possible connection to an end user.

An extension to this process to enhance the time needed for the setup phase of the application connection would be to include tables of Classless Inter-Domain Routing (CIDR), addresses to be referenced when performing the metric measurements. The performance measurement protocol could be used to determine if a network is accessible through a simple distance metric protocol request, however when used from a group of sender systems to determine which of the group has the best possible connection back to an Internet host or network number, the response to the request may be cached for later use for a specified amount of time. Caching the results of a query for later use is a common practice. Specifically using a CIDR table of addresses in the process enhances the benefits of such caching.

CIDR blocks are network numbers that have been assigned to specific Internet Service Providers and can only be routed to that ISP. Since the devices polling the destination networks or recipients may be located on separate networks in separate physical locations, one may have a better performance metric to the client address than the others. The primary difference between a CIDR block of numbers and non-CIDR network numbers, is that the block can only be routed to recipients by the ISP that owns the CIDR and the CIDR blocks cannot be multi-homed. As a result, the best path information is less likely to change unless there is a problem with the server or the server's network connection that has the best connection statistics from previous queries, or a network problem at a crucial point, like the Network Access Point (NAP), between providers if the server and client are not already connected to the same ISP.

When a CIDR address is the destination address of the performance measurement packet 20, a cached response is used to provide the required information. The procedure operates to generate a response including current performance metrics according to the method described with reference to FIG. 3 or 4 above. Once this response is generated and sent to the sender 1, the response can be cached for a predetermined period of time by the sender 1. Since CIDR performance metrics for CIDR addresses are unlikely to change often, providing the information in the cached response to the requesting application is sufficient and there is no need to generate and send performance measurement packets each time. The cache time can be higher for CIDR network blocks than non-CIDR network blocks since CIDR blocks can only be routed by one ISP and the best path information is less likely to change. Non-CIDR addresses might be routed via a dynamic routing protocol such as the Border Gateway Protocol (BGP). However, the BGP protocol allows for more potential change of the best path information.

It is a common practice to cache results to queries, however the use of the CIDR addresses can allow for the cached results to be more useful for that subset of Internet addresses for a greater period of time. The time or other means to determine when the cache should be purged is a programmed rule in the sender. CIDR addresses would limit the time needed for the initial connection setup phase for instance where the best possible path to take was cached. This practice would help to limit network traffic and the number of requests a client may receive for performance metric information.

Figure 5:
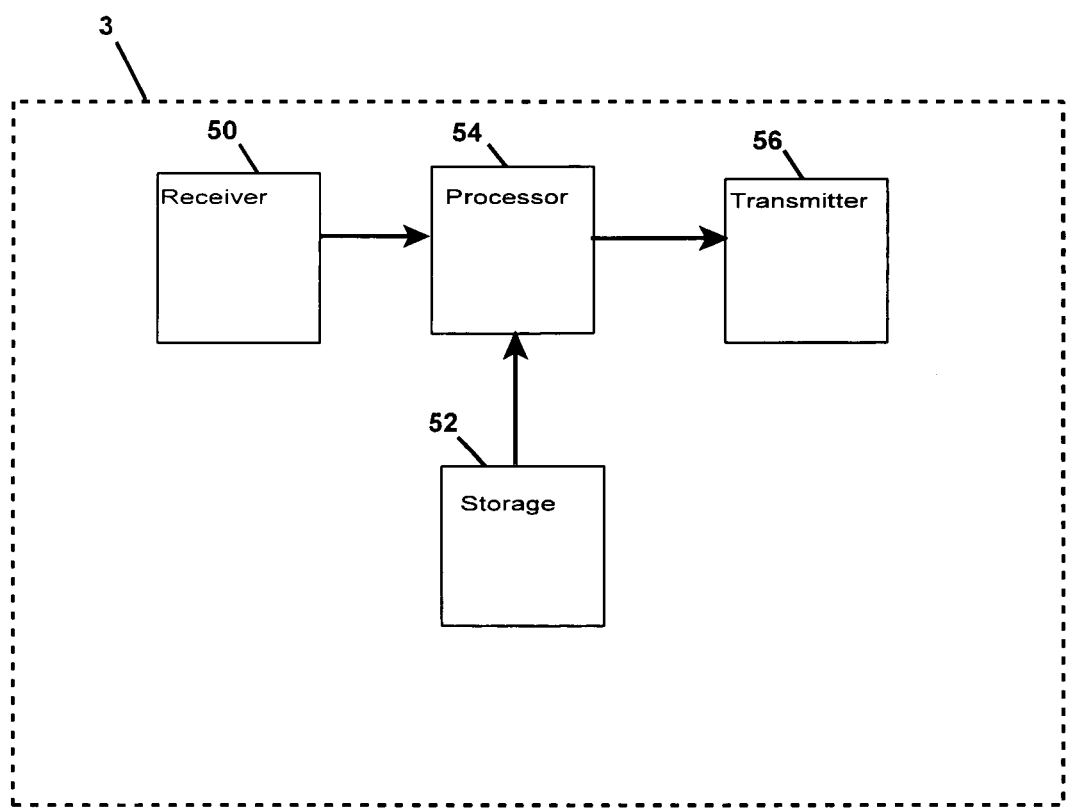
FIG. 5 is a block diagram illustrating a border device according to an embodiment of the present application.

The border device 3 of the present application is further described with reference to FIG. 5. The border device 3 may be a firewall, periphery router or network server for example, and is provided at a boundary of a recipient personal computer, network, or otherwise between the sender and recipient. The border device 3 includes a receiver 50 for receiving performance measurement packets from a sender 1, and storage 52 for storing at least one destination address corresponding to a recipient for which the boundary device 3 will intercept performance measurement packets and generate a response. The border device 3 may respond to a plurality of destination addresses or network numbers in the destination address slot in the performance measurement packet 20. A processor 54 is provided to generate the response to the performance measurement packet 20 with the response including the information regarding connection between sender and recipient and substituting the destination address or network number of the recipient 2 provided in the performance measurement packet 20 for the address or network number of the border device 3 in the source address of the response. A transmitter 56 is provided to transmit the response back to the sender 1.

Where the border device is used in conjunction with the method described with reference to FIG. 4, the border device 3 comprises substantially the same elements. However, the processor 54 will not automatically respond to the performance measurement packet 20, but will respond based on the predetermined rules which can be stored in the storage 52.

In either case, the border device 3 provides metric information to the sender 1 such that the sender 1 can use the information to establish a favorable connection or satisfactorily engage applications requiring the metric information about the connection to the recipient 2. However, the IP address and network number of the border device 3 are concealed in the response. Therefore, the sender 1 of the performance measurement packet 20, will be unable to accurately identify the border device 3 and therefore cannot identify different entries into the recipient network or destinations inside the recipient network.

The problems identified above are solved in a communications system and method in which Internet protocol packets used for gathering performance statistics are intercepted at a programmed point in the network to enhance security of the network. The Internet Protocol (IP) packet is received by a router or firewall device and intercepted based on a configurable parameter on behalf of the ultimate destination host. The router or firewall device determines, based on the programmed rules, whether or not to respond the request on behalf of the client. If there is a rule to permit a response, router or firewall creates a packet response to return the metric count to the source host on behalf of the client. The source address of the return packet can either be the actual destination IP address of the initial packet or the network number to provide ambiguity as to the existence of active hosts on the network. Ideally, the use of this protocol would be at the edge of the recipient network of the packet to provide a meaningful statistic to the device or program eliciting the response. A few benefits result from the use of this protocol, the protocol returns a minimal amount of information to the requesting host, which may or may not be malicious, and path information for the connection is not returned to the requesting host. Current applications of the protocol would be devices on the Internet that gather performance measurements to determine the best route or path a connection can take to provide the best possible connection for an application.

In addition, the system and method would be useful in load balancers for Internet protocols and web caching devices which perform metric measurement functions to gather statistics on the best path from several points in the network back to an end user or client. A client may initiate a web connection to a particular server and the server attempts to determine which of several alternative servers to connect the client to based upon the performance metrics from the server back to the client. The above mentioned protocol would be used at the client network end of the connection to protect the network from mapping attempts that are possible through the use of any ICMP, TCP, or UDP packet that is passed through the perimeter of the network. This protocol could be adapted at the router or firewall level to intercept an existing packet type, such as a ping or a traceroute packet for compatibility to existing protocols and immediate usefulness on the network. This could also be formulated into a new IP protocol to replace the traceroute and ping packet types to distinguish the request as a request for distance metrics as opposed to network mapping, path gathering, or other possibly malicious packet types.

An extension of this protocol for security needs at the router or firewall of the client end, the recipient end of metric protocol, can also be used to determine if there was a valid request to a server from a client/recipient in the protected network which might cause the server to initiate the request for the performance metric. The firewall or router, possibly a stateful inspection filter or application proxy firewall, would then decide to either respond to the request or discard the packet based upon the rules programmed into the device. This would be a logical extension used at a firewall level since many firewalls maintain tables of the state of active sessions that are permitted through the device.

As discussed above, at the server/sender end, additional improvements could be done to include tables of Classless Inter-Domain Routing (CIDR), addresses to be used when performing the metric measurements. The protocol could be used to determine if a network is accessible through a simple distance metric protocol request, however when used from a group of systems to determine which of the group has the best possible connection back to an Internet host or network number, the response to the request may be cached for later use for a specified amount of time. It is a common practice to cache results to queries, however the use of the CIDR addresses can allow for the cached results to be more useful for that subset of Internet addresses for a greater period of time, which can be programmed into the device. CIDR addresses are addresses that have been assigned to specific Internet Service Providers and each block can only be used within the ISP that owns the network block. Since the devices polling the clients may be located on separate networks in separate physical locations, one may have a better performance metric to the client address than the others. The unique characteristic of a CIDR address is that it can only be routed by the ISP that owns the CIDR address and may assign these to their clients. As a result, the best path information is not likely to change unless there is a problem with the server or the server's network or at a crucial point, like the Network Access Point (NAP), between providers if the server and client are not already connected to the same ISP. The cache time can be higher for CIDR addresses than non-CIDR addresses since the CIDR addresses can only be routed by one ISP and the best path information is less likely to change. Non-CIDR addresses might be routed via a dynamic r outing protocol such as the Border Gateway Protocol (BGP) that is more dynamic and has more potential for the best path information to change. A method and apparatus for gathering information about a connection between a sender and a recipient while avoiding transfer of information that can be used to attack the recipient or recipient server is provided.

While specific embodiments of this invention have been described herein it should be noted that many variations are possible. This invention is intended to include all variations permissible under the claims attached hereto.

What is claimed is:

1. A method of gathering information about a connection between a sender and a recipient in a network comprising the steps of:
    generating an information query by the sender;
    sending the information query to the recipient;
    receiving the information query at a border device of the recipient; and
    processing the information query at the border device to provide information in a response to the information query, the response from the border device to the sender including address identification information of the recipient that is different than that of the border device and different than that of the sender, and measurement information about a portion of the connection, the portion being that between the sender and the border device.

2. The method of claim 1 further comprising the steps of:
    storing at least a portion of the information sent from the border device to the sender at the sender when a destination address of the information query corresponds to a predetermined group of addresses stored at the sender; and
    utilizing the stored information from the response whenever an information query is generated including any of the predetermined group of addresses stored at the sender.

3. The method of claim 2, further comprising the steps of: deleting the stored information after a predetermined period of time.

4. The method of claim 1, wherein in the receiving step, the border device responds on behalf of one or more other active or inactive addresses, where the information query is selected from a group consisting of a service availability query, a system availability query and a performance measurement query.

5. A method of gathering information about a connection between a sender and a recipient in a network comprising the steps of:
    generating an information query by the sender;
    sending the information query to the recipient; and
    receiving the information query at a border device of the recipient; and
    processing the information query at the border device according to a plurality of predetermined rules,
    wherein said predetermined rules include:
    (a) providing information requested by the information query in a response to the information query, the response from the border device to the sender including address identification information of the recipient that is different than that of the border device and different than that of the sender and, measurement information about a portion of the connection;
    (b) discarding the information query; and
    (c) passing the information query through the border device to the recipient for response.

6. The method of claim 5 wherein:
    one of said plurality of predetermined rules provides for discarding the information query when the information query is of a size larger than a predetermined range of allowable sizes.

7. The method of claim 5, wherein:
    one rule of said plurality of predetermined rules provides for passing the information query through the border unit to the recipient for response when the information query includes predetermined identification information.

8. The method of claim 5, further comprising the steps of:
    storing at least the information of the response provided from the border device when a destination address of the information query to which the response was generated corresponds to any of a plurality of predetermined addresses stored at the sender; and
    using the stored information of the response whenever an information query including any of the plurality of predetermined addresses stored at the sender is generated rather than sending the information query to the recipient.

9. The method according to claim 8, wherein:
    the stored information is deleted after a predetermined period of time passes.

10. The method of claim 5, wherein in the receiving step, the border device responds on behalf of one or more other active or inactive addresses, where the information query is selected from a group consisting of a service availability query, a system availability query and a performance measurement query.

11. A border device positioned between a sender and a recipient for use in gathering information regarding a connection between the sender and the recipient in a network, the border device comprising:
    a receiver for receiving an information query from the sender addressed to the recipient;
    a processor for processing the information query on behalf of the recipient to generate a response to the sender including address identification information of the recipient that is different than that of the border device and different than that of the sender, and measurement information about a portion of the connection, the portion being that between the sender and the border device; and a transmitter for sending the response to the sender.

12. The border device of claim 11, wherein:

the border device responds to information queries for a plurality of recipients.

13. The border device of claim 11, wherein the border device is a router.

14. The method of claim 11, wherein the border device responds on behalf of one or more other active or inactive addresses, where the information query is selected from a group consisting of a service availability query, a system availability query and a performance measurement query.

15. A method of gathering performance measurement information regarding a connection between a sender and a recipient in a network comprising the steps of:

generating a performance measurement packet by the sender;

sending the performance measurement packet to the recipient;

receiving the performance measurement packet at a border device of the recipient; and processing the performance measurement packet at the border device according to a plurality of predetermined rules, wherein said predetermined rules provide for one of:

(a) generating a response packet to the performance measurement packet to provide performance metric information to be sent from the border device to the sender, the response packet including address information of the recipient that is different than that of the border device and different than that of the sender and performance metric information about a portion of the connection, the performance metric information being about the portion between the sender and the border device;

(b) discarding the performance measurement packet; and (c) passing the performance measurement packet to the recipient.

16. The method of claim 15, wherein:

one of the predetermined rules provides for discarding the performance measurement packet when a size of the performance measurement packet exceeds a range of allowable sizes.

17. The method of claim 15, wherein:

one rule of the plurality of predetermined rules provides for passing the performance measurement packet through the border device to the recipient when the performance measurement packet includes predetermined identification information.

18. The method according to claim 15, further comprising the steps of:

storing at least the performance metric information of the response packet generated by the border device in response to the performance measurement packet when a destination address of the performance measurement packet corresponds to one of a plurality of predetermined addresses stored at the sender; and using the stored performance metric information of the response packet whenever a performance measurement packet including any of the plurality of predetermined addresses stored at the sender is generated by the sender rather than sending the performance measurement packet to the recipient.

19. The method according to claim 18, further comprising the step of:

deleting the stored performance metric information after a predetermined period of time.

* * * * *